United States Patent
Lee

(10) Patent No.: US 9,394,833 B2
(45) Date of Patent: Jul. 19, 2016

(54) CONTROL SYSTEM AND METHOD FOR CONTINUOUSLY VARIABLE VALVE LIFT APPARATUS

(71) Applicants: Hyundai Motor Company, Seoul (KR); Kia Motors Corporation, Seoul (KR)

(72) Inventor: Joonsuck Lee, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 247 days.

(21) Appl. No.: 14/079,107

(22) Filed: Nov. 13, 2013

(65) Prior Publication Data

US 2014/0182546 A1   Jul. 3, 2014

(30) Foreign Application Priority Data

Dec. 28, 2012   (KR) .................... 10-2012-0157504

(51) Int. Cl.
*F02D 13/00* (2006.01)
*F02D 13/02* (2006.01)
*F02D 41/00* (2006.01)
*F02D 41/02* (2006.01)

(52) U.S. Cl.
CPC ........ *F02D 13/0207* (2013.01); *F02D 41/0002* (2013.01); *F02D 41/022* (2013.01); *F02D 41/0225* (2013.01); *F02D 2041/001* (2013.01); *F02D 2200/101* (2013.01); *F02D 2200/602* (2013.01); *Y02T 10/18* (2013.01)

(58) Field of Classification Search
CPC .................................. F01L 2800/00–2800/08
USPC ........... 123/90.1, 90.15, 90.16, 319, 345, 346
See application file for complete search history.

(56) References Cited

U.S. PATENT DOCUMENTS

| 6,755,182 B1* | 6/2004 | Kolmanovsky | F01L 9/04 123/478 |
| 2003/0131812 A1* | 7/2003 | Hosoya | F01L 1/34 123/90.16 |
| 2009/0281713 A1* | 11/2009 | Jankovic | F01N 5/02 701/111 |

* cited by examiner

*Primary Examiner* — John Kwon
(74) *Attorney, Agent, or Firm* — Morgan, Lewis & Bockius LLP

(57) ABSTRACT

A method of controlling a continuously variable valve lift apparatus, may include determining a desired valve lift of the continuously variable valve lift apparatus based on a driving status, determining a first correction factor based on the driving status, determining a second correction factor based on an amount of air flowing into an engine, determining a final correction factor from the first correction factor and the second correction factor, determining a critical value of operation inclination of the valve lift from the final correction factor and an operation status of a transmission, and controlling the operation of the continuously variable valve lift apparatus on the basis of the determined desired valve lift within the critical value of the operation inclination of the valve lift.

10 Claims, 3 Drawing Sheets

CONTROL SYSTEM AND METHOD FOR CONTINUOUSLY VARIABLE VALVE LIFT APPARATUS

CROSS-REFERENCE TO RELATED APPLICATION

The present application claims priority to Korean Patent Application No. 10-2012-0157504 filed on Dec. 28, 2012, the entire contents of which is incorporated herein for all purposes by this reference.

BACKGROUND OF THE INVENTION

1. Field of the Invention

The present invention relates to a system and a method of controlling a continuously variable valve lift apparatus. More particularly, the present invention relates to a system and a method of controlling a continuously variable valve lift apparatus which can implement non-excessive response of a variable valve lift apparatus.

2. Description of Related Art

Internal combustion engines generate power by receiving and burning air and fuel in a combustion chamber. When air is sucked, an intake valve is operated by a camshaft, and air is sucked into the combustion chamber while the intake valve is open. Further, an exhaust valve is operated by the camshaft, and air is discharged from the combustion chamber while the exhaust valve is open.

The optimum operation of the intake valve/exhaust valve, however, depends on the RPM of the engine. That is, an appropriate time for lifting or valve opening/closing depends on the RPM of the engine. In order to implement an appropriate valve operation in accordance with the RPM of the engine, as described above, a VVL (Variable Valve Lift) apparatus and a CVVL (Continuously variable Valve Lift Apparatus) which have a plurality of shapes of cam operating valves or operating valves at different lifts in accordance with the RPM of an engine have been studied.

A CVVL engine can reduce pumping loss and implement an optimum valve lift with the engine load in the intake stroke. Further, the CVVL engine can reduce the time for filling a surge tank and directly control the amount of intake air by varying the valve lift. Therefore, the CVVL engine can achieve quick response.

The quick response of the CVVL engine may turn out to be excessive response in overdriving and the excessive response may interfere with stable driving.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for controlling a continuously variable valve lift apparatus having advantages of being able to implement non-excessive response by limiting the reaction time of a valve lift in accordance with the current operation status of an engine.

In an aspect of the present invention, a method of controlling a continuously variable valve lift apparatus, may include determining a desired valve lift of the continuously variable valve lift apparatus based on a driving status, determining a first correction factor based on the driving status, determining a second correction factor based on an amount of air flowing into an engine, determining a final correction factor from the first correction factor and the second correction factor, determining a critical value of operation inclination of the valve lift from the final correction factor and an operation status of a transmission, and controlling the operation of the continuously variable valve lift apparatus on the basis of the determined desired valve lift within the critical value of the operation inclination of the valve lift.

The first correction factor depends on required torque from a driver and the number of revolutions of the engine.

The required torque depends on the degree of press of an acceleration pedal.

The second correction factor depends on a surge tank pressure and a current valve lift.

The final correction factor is determined by multiplying the first correction factor by the second correction factor.

When the transmission is an automatic transmission, the operation status of the transmission depends on whether a damper clutch of the automatic transmission is engaged at present and the number of a current gear of the automatic transmission.

When the damper clutch of the automatic transmission is engaged, determining the critical value of the operation inclination of the valve lift based on the final correction factor, the engagement, and the number of the current gear.

When the damper clutch is disengaged, determining the critical value of the operation inclination of the valve lift based on the final correction factor, the disengagement, and the number of the current gear.

When the transmission is a manual transmission, the operation status of the transmission depends on the number of a current gear of the manual transmission.

The determining of the desired valve lift of the continuously variable valve lift apparatus based on the driving status, is performed by determining the amount of air required for the engine at present from the information including the degree of press of the accelerator pedal, the speed of a vehicle, the speed of the engine, and a surge tank pressure.

In another aspect of the present invention, a system for controlling a continuously variable valve lift apparatus, the system may include an accelerator pedal position sensor measuring an accelerator pedal position and outputting a corresponding signal, a vehicle speed sensor measuring a speed of a vehicle and outputting a corresponding signal, an engine speed sensor measuring the number of revolutions of an engine and outputting a corresponding signal, a surge tank pressure sensor measuring a pressure in a surge tank and outputting a corresponding signal, a transmission operation sensor detecting an operation status of a transmission and outputting a corresponding signal, the continuously variable valve lift apparatus, and a control unit controlling the operation of the continuously variable valve lift apparatus in response to the corresponding signals from the accelerator pedal position sensor, the vehicle speed sensor, the engine speed sensor, the surge tank pressure sensor, and the transmission operation sensor, wherein the control unit performs a series of instruction for the method of claim 1.

The transmission is an automatic transmission, wherein a transmission operation system detects whether a damper clutch of the automatic transmission is engaged and the number of a current gear and outputs a corresponding signal.

The transmission is a manual transmission, wherein the transmission operation sensor detects the number of a current gear of the manual transmission and outputs a corresponding signal.

According to a system and a method for controlling a continuously variable valve lift apparatus of an exemplary embodiment of the present invention, it is possible to achieve non-excessive response by limiting reaction time of the valve lift on the basis of the current operation status of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
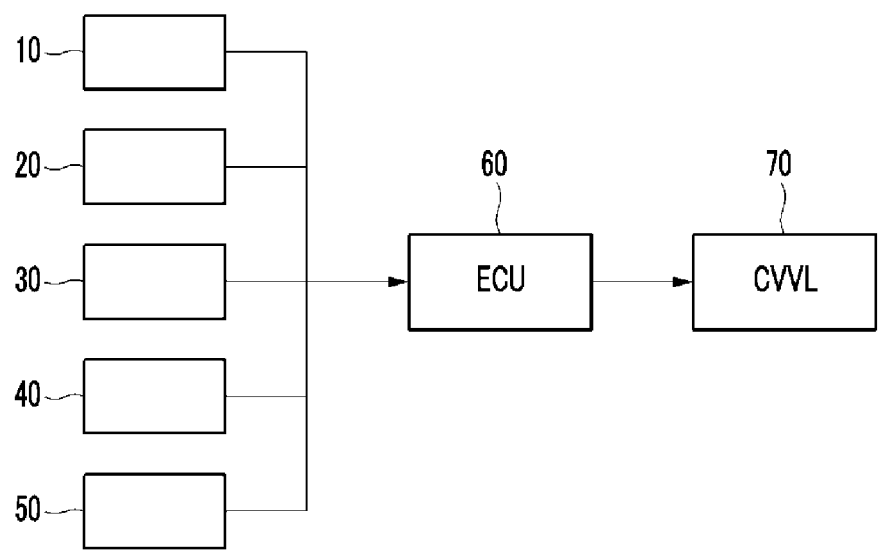
FIG. 1 is a diagram showing a system for controlling a continuously variable valve lift apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Like reference numerals are given to like components throughout the specification.

Throughout the specification, unless explicitly described to the contrary, the word "include" and variations such as "includes" or "including", will be understood to imply the inclusion of stated elements but not the exclusion of any other elements.

An exemplary embodiment of the present invention will hereinafter be described in detail with reference to the accompanying drawings.

FIG. 1 is a diagram showing a system for controlling a continuously variable valve lift apparatus according to an exemplary embodiment of the present invention.

A system for controlling a continuously variable valve lift apparatus according to an exemplary embodiment of the present invention includes an accelerator pedal position sensor 10 measuring the accelerator pedal position and outputting a corresponding signal, a vehicle speed sensor 20 measuring the speed of a vehicle and outputting a corresponding signal, an engine speed sensor (or an rpm sensor) 30 measuring the number of revolutions of an engine and outputting a corresponding signal, a surge tank pressure sensor 40 measuring the pressure in a surge tank and outputting a corresponding signal, a transmission operation sensor 50 detecting the operation status of a transmission and outputting a corresponding signal, a continuously variable valve lift apparatus 70, and a control unit 60 controlling the operation of the continuously variable valve lift apparatus 70 in response to the output signals from the accelerator pedal position sensor 10, the vehicle speed sensor 20, the engine speed sensor 30, the surge tank pressure sensor 40, and the transmission operation sensor 50, in which the control unit 60 can perform a series of instructions for controlling the operation of the continuously variable valve lift apparatus 70.

When the transmission is an automatic transmission, the transmission operation sensor 50 may detect the engagement status of a damper clutch and the number of the current gear of the automatic transmission and output a corresponding signal.

When the transmission is a manual transmission, the transmission operation sensor 50 may detect the number of the current gear of the manual transmission and output a corresponding signal.

Figure 2:
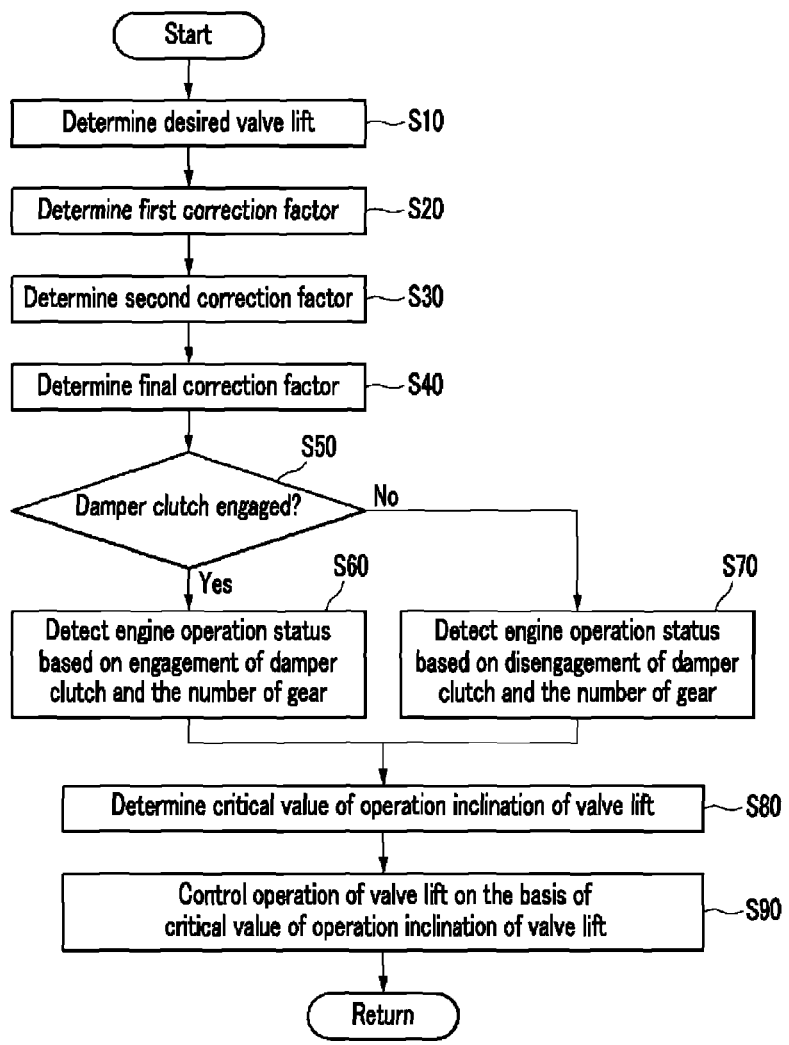
FIG. 2 is a flowchart illustrating a method of controlling a continuous valve lift apparatus according to the various exemplary embodiments of the present invention.

FIG. 2 is a flowchart illustrating a method of controlling a continuous valve lift apparatus according to the first exemplary embodiment of the present invention.

The method of controlling a continuously variable valve lift apparatus according to the first exemplary embodiment of the present invention is applied, when the transmission is an automatic transmission.

Referring to FIG. 1, the control unit 60 determines a desired valve lift of the continuously variable valve lift apparatus 70 in accordance with the driving status (S10).

The control unit 60 can determine the desired valve lift of the continuously variable valve lift apparatus 70 according to the driving status by receiving the degree of press of an accelerator pedal, the speed of the vehicle, the speed of the engine, and the surge tank pressure information, and by calculating the amount of the current necessary air for the engine.

Specific conditions of the vehicle, for example, the vehicle speed, the engine speed, the number of gear, and torque required by the driver under load depend on the acceleration pedal. The final torque is determined in consideration of the mechanical friction torque of an engine, a loss of torque generated in auxiliary components such as an air conditioner or a power generator, and drivability, on the basis of the required torque. The flow rate of air, the ignition timing, and the amount of fuel are determined to achieve the final desired torque. The flow rate of air depends on a desired throttle angle for controlling the pressure of the surge tank and the desired valve lift for achieving the final flow rate of air. The desired valve lift, which is apparent to those skilled in the art, may be found from a map set in advance on the basis of the variables.

The desired valve lift, however, may interfere with stable driving because it shows excessive response in overdriving of a vehicle.

The method of controlling a continuously variable valve lift apparatus according to the first exemplary embodiment of the present invention achieves the desired valve lift, using correction factors for correcting the excessive response and allows a valve lift to be stably varied by determining a predetermined limit.

The control unit 60 determines a first correction factor according to the driving status (S20). The first correction factor may depend on the required torque from the driver and the number of revolutions of the engine and the required torque may depend on the degree of press of the accelerator pedal. The first correction factor may be obtained from a map set in advance by an experiment.

The control unit 60 determines a second correction factor based on the amount of air flowing into the engine (S30). The second correction factor may depend on the surge tank pressure and the current valve lift and may be obtained from a map set in advance by an experiment.

The control unit 60 determines the final correction factor from the first correction factor and the second correction factor (S40). The final correction factor may be determined by multiplying the first correction factor by the second correction factor. Therefore, the final correction factor is determined in consideration of the required torque from a driver, the number of revolutions of the engine, the surge tank pressure, and the current valve lift.

The control unit 60 determines a critical value of operation inclination of the valve lift, depending on the final correction factor and the operation status of the transmission (S80).

The operation status of the transmission, when the transmission is an automatic transmission, may depend on whether the damper clutch of the automatic transmission is engaged, and the number of the current gear of the automatic transmission.

That is, the control unit 60 determines whether the damper clutch of the automatic transmission is engaged in response to a corresponding signal from the transmission operation sensor 50 (S50), and when the damper clutch is engaged, it determines the critical value of operation inclination of the valve lift based on the final correction factor, the engagement, and the number of the current gear (S60 and S80).

Further, the control unit 60 determines whether the damper clutch of the automatic transmission is engaged in response to a corresponding signal from the transmission operation sensor 50 (S50), and when the damper clutch is disengaged, it determines the critical value of operation inclination of the valve lift based on the final correction factor, the disengagement, and the number of the current gear (S70 and S80).

The critical value of operation inclination of the valve lift based on the final correction factor, the engagement or disengagement, and the number of the current gear may be determined by a map stored in advance by an experiment. The critical value of operation inclination of the valve lift is a value restricting the operation of the variable valve lift apparatus 70, and for example, it may be defined as a valve lift inclination of the variable valve lift apparatus which limits the degree of change in valve lift per hour.

The control unit 60 controls the operation of the continuously variable valve lift apparatus 70 on the basis of the determined desired valve lift within the critical value of operation inclination of the valve lift (S90).

For example, the control unit 60 achieves the determined desired valve lift with the critical value of operation inclination of the valve lift by controlling the operation of the continuously variable valve lift apparatus 70.

The method of controlling a continuously variable valve lift apparatus according to the first exemplary embodiment of the present invention restricts the operation of the variable valve lift apparatus 70 within the critical value of operation inclination of the valve lift obtained from the current operation status of the engine and the final correction factor obtained from the required torque from the driver, the number of revolutions of the engine, the surge tank pressure, and the current valve lift, therefore, a sudden operation of the valve lift is prevented, resulting in stable driving. Further, the method of controlling a continuously variable valve lift apparatus according to the first exemplary embodiment of the present invention can increase the lifespan of a continuously variable valve apparatus by suppressing frequent operation of the continuously variable valve lift apparatus according to the first exemplary embodiment of the present invention.

Figure 3:
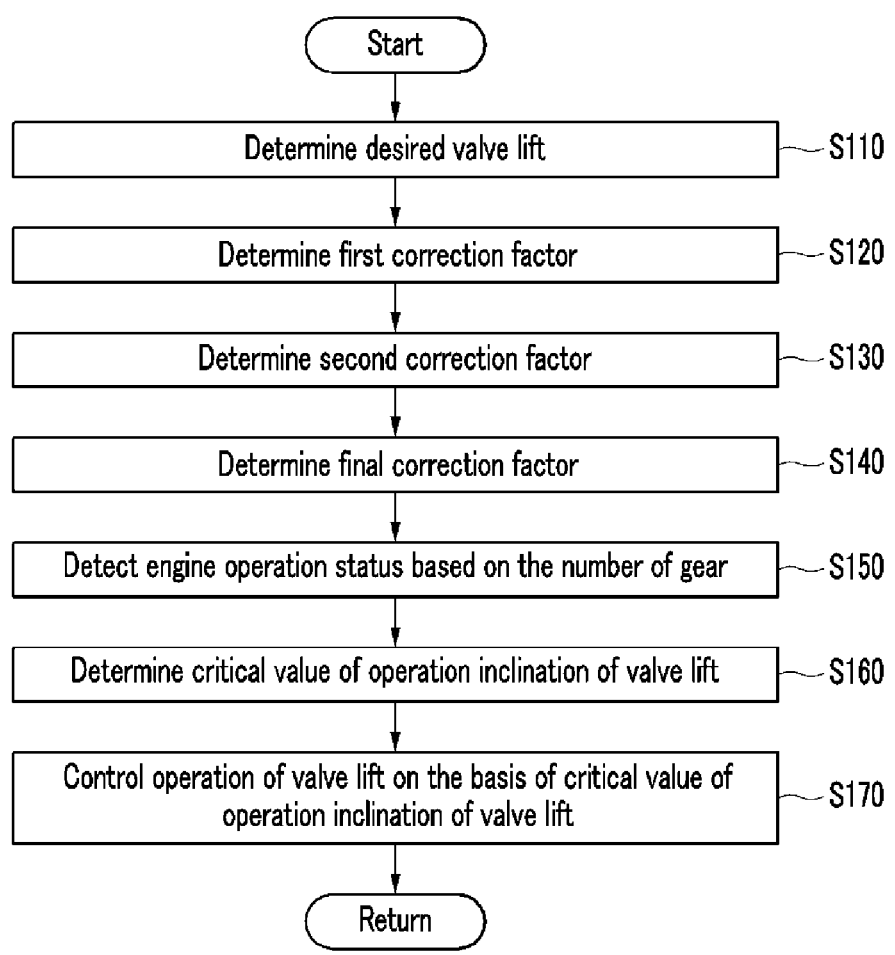
FIG. 3 is a flowchart illustrating a method of controlling a continuous valve lift apparatus according to the various exemplary embodiments of the present invention.

FIG. 3 is a flowchart illustrating a method of controlling a continuous valve lift apparatus according to the second exemplary embodiment of the present invention.

The method of controlling a continuously variable valve lift apparatus according to the second exemplary embodiment of the present invention is applied, when the transmission is a manual transmission.

The method of controlling a continuously variable valve lift apparatus according to the second exemplary embodiment of the present invention is the same as the method of controlling a continuously variable valve lift apparatus according to the first exemplary embodiment of the present invention described above, except the operation status of an automatic transmission, such that repeated description is not provided.

Referring to FIGS. 1 to 3, the control unit 60 determines a desired valve lift of the continuously variable valve lift apparatus 70 in accordance with the driving status (S110).

The control unit 60 determines a first correction factor according to the driving status (S120). The first correction factor may depend on the required torque from the driver and the number of revolutions of the engine and the required torque may depend on the degree of press of the accelerator pedal. The first correction factor may be obtained from a map set in advance by an experiment.

The control unit 60 determines a second correction factor based on the amount of air flowing into the engine (S130). The second correction factor may depend on the surge tank pressure and the current valve lift and may be obtained from a map set in advance by an experiment.

The control unit 60 determines the final correction factor from the first correction factor and the second correction factor (S140). The final correction factor may be determined by multiplying the first correction factor by the second correction factor.

The control unit 60 detects the operation status of the transmission based on the final correction factor and the number of gear (S150) and determines a critical value of operation inclination of the valve lift (S160).

That is, the control unit 60 determines the critical value of operation inclination of the valve lift on the basis of the number of gear of the manual transmission and the final correction factor in response to a corresponding signal from the transmission operation sensor 50.

The critical value of operation inclination of the valve lift based on the final correction factor and the number of the current gear may be determined by a map stored in advance by an experiment.

The control unit 60 controls the operation of the continuously variable valve lift apparatus 70 on the basis of the determined desired valve lift within the critical value of operation inclination of the valve lift (S170).

The method of controlling a continuous valve lift apparatus according to the second exemplary embodiment of the present invention restricts the operation of the variable valve lift apparatus 70 within the critical value of operation inclination of the valve lift obtained from the current operation status of the engine and the final correction factor obtained from the required torque from the driver, the number of revolutions of the engine, the surge tank pressure, and the current valve lift, therefore, a sudden operation of the valve lift is prevented, resulting in stable driving. Further, the method of controlling a continuously variable valve lift apparatus according to the second exemplary embodiment of the present invention can increase the lifespan of a continuously variable valve apparatus by suppressing frequent operation of the continuously variable valve lift apparatus according to the first exemplary embodiment of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a continuously variable valve lift apparatus, the method comprising:
    determining, by a control unit, a desired valve lift of the continuously variable valve lift apparatus based on a driving status;
    determining, by the control unit, a first correction factor based on the driving status;
    determining, by the control unit, a second correction factor based on an amount of air flowing into an engine;
    determining, by the control unit, a final correction factor from the first correction factor and the second correction factor wherein the final correction factor is determined by multiplying the first correction factor by the second correction factor;
    determining, by the control unit, a critical value of operation inclination of the valve lift, wherein the critical value is preset based on the final correction factor and an operation status of a transmission; and
    controlling, by the control unit, the operation of the continuously variable valve lift apparatus on the basis of the determined desired valve lift within the critical value of the operation inclination of the valve lift.

2. The method of claim 1, wherein the first correction factor depends on required torque from a driver and the number of revolutions of the engine.

3. The method of claim 2, wherein the required torque depends on the degree of press of an acceleration pedal.

4. The method of claim 2, wherein the second correction factor depends on a surge tank pressure and a current valve lift.

5. The method of claim 4, wherein the final correction factor is determined by multiplying the first correction factor by the second correction factor.

6. The method of claim 1, wherein when the transmission is an automatic transmission, the operation status of the transmission depends on whether a damper clutch of the automatic transmission is engaged at present and the number of a current gear of the automatic transmission.

7. The method of claim 6, wherein when the damper clutch of the automatic transmission is engaged, determining the critical value of the operation inclination of the valve lift based on the final correction factor, the engagement, and the number of the current gear.

8. The method of claim 6, wherein when the damper clutch is disengaged, determining the critical value of the operation inclination of the valve lift based on the final correction factor, the disengagement, and the number of the current gear.

9. The method of claim 1, wherein when the transmission is a manual transmission, the operation status of the transmission depends on the number of a current gear of the manual transmission.

10. The method of claim 1, wherein the determining of the desired valve lift of the continuously variable valve lift apparatus based on the driving status, is performed by determining the amount of air required for the engine at present from the information including the degree of press of the accelerator pedal, the speed of a vehicle, the speed of the engine, and a surge tank pressure.

* * * * *